(12) United States Patent
Saini et al.

(10) Patent No.: US 10,366,623 B2
(45) Date of Patent: Jul. 30, 2019

(54) SYSTEMS AND METHODS FOR ELECTRONIC EVALUATION OF CANDIDATES

(71) Applicants: Pramod Saini, New Delhi (IN); Amit Saini, New Delhi (IN)

(72) Inventors: Pramod Saini, New Delhi (IN); Amit Saini, New Delhi (IN)

( * ) Notice: Subject to any disclaimer, the term of this patent is extended or adjusted under 35 U.S.C. 154(b) by 138 days.

(21) Appl. No.: 15/501,860

(22) PCT Filed: Aug. 6, 2015

(86) PCT No.: PCT/IN2015/050083
§ 371 (c)(1),
(2) Date: Feb. 6, 2017

(87) PCT Pub. No.: WO2016/020940
PCT Pub. Date: Feb. 11, 2016

(65) Prior Publication Data
US 2017/0229033 A1    Aug. 10, 2017

(51) Int. Cl.
| | |
|---|---|
| *G06F 21/00* | (2013.01) |
| *G09B 7/077* | (2006.01) |
| *G06F 21/31* | (2013.01) |
| *G06F 21/62* | (2013.01) |
| *G06F 21/30* | (2013.01) |
| *G06Q 10/10* | (2012.01) |
| *G06Q 50/20* | (2012.01) |
| *G09B 7/06* | (2006.01) |

(Continued)

(52) U.S. Cl.
CPC ............. *G09B 7/077* (2013.01); *G06F 21/30* (2013.01); *G06F 21/31* (2013.01); *G06F 21/62* (2013.01); *G06Q 10/10* (2013.01); *G06Q 50/20* (2013.01); *G09B 7/06* (2013.01); *H04L 63/08* (2013.01); *H04L 63/102* (2013.01); *H04L 63/126* (2013.01); *G06F 16/90344* (2019.01); *G06Q 2220/10* (2013.01)

(58) Field of Classification Search
CPC ........ G06F 21/30; G06F 21/305; G06F 21/31; G06F 21/45; G06F 21/60; G06F 21/604; G06F 21/606; G06F 21/62; G06F 21/6218; G06F 21/629
See application file for complete search history.

(56) References Cited

U.S. PATENT DOCUMENTS

2005/0086498 A1* 4/2005 Hulick ................ G09B 5/00
713/186
2005/0255438 A1* 11/2005 Manos ................ G09B 7/00
434/323

* cited by examiner

*Primary Examiner* — Edward Zee (57) ABSTRACT

Embodiments of present invention provide a system and method for electronic evaluation of candidates. The system provides a central server adapted to be communicably coupled to a plurality of client devices. Graders/evaluators may generate a gradation test that is stored on the central server or any other server communicably coupled thereto. The central servers makes available, to duly authenticated client devices, through exam-center servers, the gradation test over a secure channel, which may be answered by the candidates electronically. The answers of candidates, including answers written in their own handwriting using a tablet and stylus, are stored on the central server and made available to duly authenticated grader/evaluators for evaluation. The present invention enables evaluation to be carried out in a time-effective and cost-efficient manner with utmost security.

22 Claims, 3 Drawing Sheets

(51) Int. Cl.
*H04L 29/06* (2006.01)
*G06F 16/903* (2019.01)

SYSTEMS AND METHODS FOR ELECTRONIC EVALUATION OF CANDIDATES

FIELD OF THE INVENTION

The present invention is generally related to electronic gradation of candidates. More specifically, the present invention relates to system and method for electronically preparing and presenting a gradation test to candidates, electronically capturing the candidate responses including handwritten ones and for electronic evaluation of the gradation test in a secure manner.

BACKGROUND OF THE INVENTION

Conventional methods of grading of candidates include creating a gradation test by one or more evaluators/graders, printing hard copies of the gradation test, distributing the hard copies amongst the candidates for receiving their response to the gradation test and conducting manual evaluation of the responses by one or more evaluators/graders. However, the said conventional methods have serious drawbacks in terms of security issues and huge cost involvement in maintaining the confidentiality of the gradation tests. Particularly, it is required to maintain gradation test in extreme confidentiality at the time same is being created by the evaluators/graders and until the same is provided to the candidates for receiving their responses. For instances, the gradation tests and responses thereto (in the form of answer sheets) are generally in paper form and there are chances of leakages of gradation test from printing presses, during transportation, and even while the same are stored at examination centers before the actual examination. Also, the answer sheets need to be secured for avoiding access by any unauthorized persons who may tamper with the same. Maintaining security of such paper form of gradation test and/or answer sheets, such as by assigning more persons and/or storage spaces, controlling movement of the paper form etc., entails huge cost involvement.

Further, in said conventional methods administering logistics of gradation test (paper form) and answer sheets is very cumbersome. The answer sheets are required to be tagged such that the actual identification number of the candidates is not accessible to the graders/evaluators, however at the same time the answers should be relatable to the respective candidate. Maintaining the information about such tagging is cumbersome and entails further security to maintain confidentiality. Besides, in the event of any need of re-evaluation of the answer sheets, it is both time consuming and cumbersome to search for the answer sheet, particularly when a substantial time has passed since the first evaluation of the answer sheet.

Moreover, in the conventional method, collation of marks after evaluating the answer sheets takes time and is prone to human errors since marks are totaled manually. Also, the distribution and collection of answer sheets to students after gradation is a time consuming and cumbersome process, more so when the number of students/candidates taking the exams is large. Though, some of the Examination accreditation agencies have initiated the scanning/digitization of the answer sheets which are being made available to the students through electronic means; generally through the portals of such Examination accreditation agencies.

To solve few of the problems associated with conducting manual tests, US 20070048723 recites a system for securely administering computerized tests over a network that reduce or eliminate the need for constant human observation of examinees and dedicated testing centers. The system includes a central server coupled to a proctor server that presents with a test paper electronically. Also, CN 102800219 recites a LAN-based online examination system, which includes a user login module, including the user name input unit; a password input unit and the verification code input unit; an Information input module connected to the server database; information query module to query the current information in the database server; a history module to query the server database for historical information; and an administrator module used for management.

However, the said systems suffer from the drawback that there is no provision to maintain confidentiality at the time of creation of the test paper for subjective examinations including complex drawings or formulation of equations; or when such test paper is distributed amongst the candidates for gradation. Also, the said systems do not ensure any security of the answer sheets having responses of the candidates. Besides, the said systems still do not solve the problems associated with administering logistics of gradation tests. Also, the said systems do not enable receiving candidates' responses in their handwriting and requires the test to be specifically configured in particular electronic format. For instance, for subjects like mathematics or physics, the candidate may be required to write complex equations or draw diagrams, which may not be possible in purely electronic format tests; or for life science subjects where complex human anatomical drawings are required to be drawn and explained. Moreover, candidates, who are not too tech-savvy or are not able to use the keyboards or touch screens as input modes for data, may find it very difficult to take the test and may need specific computer training or typing training prior to the test.

In view of the foregoing, there exists a need for evaluation of candidates in a manner that obviates the various disadvantages of the conventional evaluation methods and systems, as discussed. Particularly, there exists a need to enable evaluation of candidates in an easy, time-effective and cost-efficient manner and at the same time ensuring sufficient security of the gradation tests as well as the responses of the candidates.

There further exists need for evaluation of candidates in a manner that enables them to take the test in their own handwriting.

Also, there exists a need to enable evaluation of candidates in a manner that avoids overheads in management of logistics of the gradation tests and the responses thereto.

OBJECTIVES OF THE INVENTION

Therefore, an objective of the present invention is to provide a system and method for enabling electronic evaluation of candidates in a simple, time-effective and cost-efficient manner.

A further objective of the present invention is to provide a system and method for enabling electronic evaluation of candidates that ensures sufficient confidentiality of the gradation tests and the responses thereto by the candidates, such that the same are inaccessible to any unauthorized person.

Another objective of the present invention is to provide a system and method for enabling electronic evaluation of candidates in a manner that does not entail overheads towards logistics management of the gradation tests and the responses thereto by the candidates.

Yet another objective of the invention is to provide a system and method for electronic evaluation of candidates such that collation of marks of the candidates after evaluation is carried out in accurately and in a time-effective manner.

Yet another objective of the invention is to provide a system and method to allow the candidates to view their answer sheets and marks allocated for each answer, after the evaluation is complete, in order to bring greater transparency into the process.

Still another objective of the present invention is to provide a system and method for electronic evaluation of candidates such that the candidates may take the test in their own handwriting thereby dispensing with the requirement for the candidate to be tech-savvy or the test to be specifically configured.

Still another objective of the present invention is to provide a system and method for electronic evaluation of candidates such that the examination/gradation test may be held in any language thereby dispensing with the requirement to develop separate systems for each set of language.

SUMMARY OF THE INVENTION

The above objectives of the invention are realised by providing a system and method for electronic evaluation of candidates. The system for electronic evaluation of candidates comprise a central server having at least one database adapted to store identification details of the candidates and a plurality of graders/evaluators and one or more gradation tests for evaluating the candidates; at least one exam-center server communicably coupled to the central server for presenting the gradation tests to the candidates communicating with the at least one exam-center server; and a plurality of client devices adapted to be communicably coupled to the central server and at least one exam-center server over a network to exchange information pertaining to the identification details and the gradation tests, the plurality of client devices pertaining to the candidates and the plurality of graders/evaluators. The central server is adapted to receive identification details of the candidates and the graders/evaluators through the respective client devices thereof and enable them to access the at least one database upon authentication, and the client devices of graders/evaluators communicate with the central server upon authentication to contribute questions and pre-determined responses thereto, and prepare the gradation tests. At least one exam-center server communicates with the central server for a pre-determined time duration to retrieve the gradation tests and present the same to authenticated client devices of candidates for receiving their response in at least one of an electronic format and handwritten format in any language of choice of the candidates. The candidates' responses are processed and transmitted by their client devices to at least one of the central server and the at least one exam-center server for storage. The candidates' responses are accessed by authenticated client devices of the graders/evaluators to evaluate the candidates based on their response to the gradation tests.

The method for electronic evaluation of candidates comprises the steps of providing a central server having at least one database adapted to store identification details of the candidates and a plurality of graders/evaluators and one or more gradation tests for evaluating the candidates; providing at least one exam-center server communicably coupled to the central server for presenting the gradation tests to the candidates communicating with the at least one exam-center server; providing a plurality of client devices adapted to be communicably coupled to the central server and at least one exam-center server over a network to exchange information pertaining to the identification details and the gradation tests, the plurality of client devices pertaining to the candidates and the plurality of graders/evaluators; receiving identification details of the graders/evaluators at the central server through their client devices to enable them to access the at least one database upon authentication, establishing communication of the client devices of graders/evaluators communicate with the central server upon authentication for enabling them to contribute questions and pre-determined responses thereto, and preparing the gradation tests, receiving identification details of the at least one exam-center server at the central server, retrieving the gradation tests at the at least one exam-center server upon establishing communication with the central server for a pre-determined time duration, receiving identification details of the candidates through their client devices at the at least one exam-center server, presenting the retrieved gradation test at authenticated client devices of candidates; receiving responses of the candidates to the gradation test in at least one of an electronic format and handwritten format in any language of choice of the candidates, processing the candidates' responses at their client devices and transmitting the processed responses to at least one of the central server and the at least one exam-center server for storage, receiving identification details of the graders/evaluators at the central server through their client devices, and evaluating the candidates' responses at authenticated client devices of the graders/evaluators.

DETAILED DESCRIPTION OF THE EMBODIMENTS

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
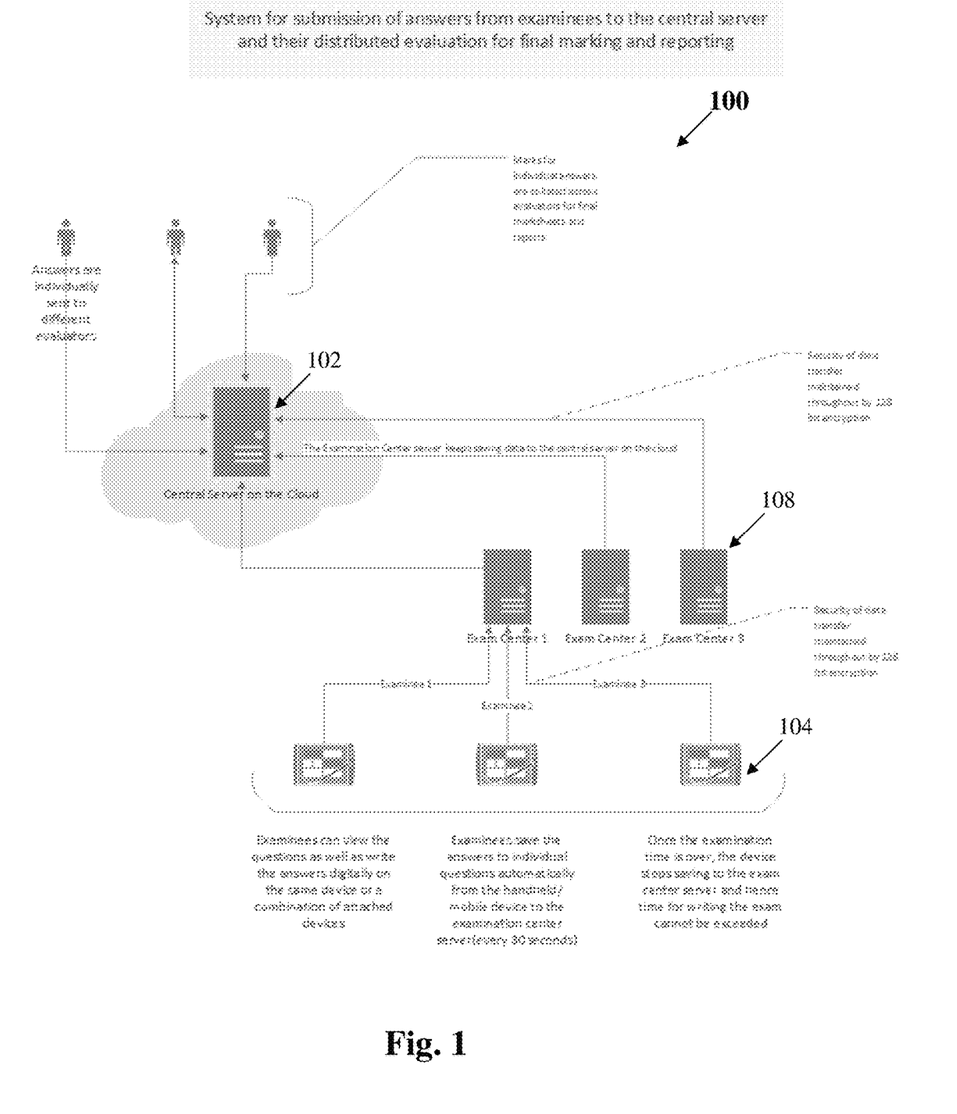
FIG. 1 illustrates an exemplary environment that may facilitate electronic evaluation of candidates in accordance with an embodiment of the invention.

FIG. 1 illustrates an exemplary environment that may facilitate electronic evaluation of candidates in accordance with an embodiment of the invention. The present invention envisages a system 100 for electronic evaluation of candidates. The system 100 is intended to obviate the drawbacks encountered in the conventional methods, as discussed above. As shown, the system 100 may include a central server 102 and a plurality of client devices 104*a*, 104*b*, 104*c* or 104*d* (generically referred to as client devices 104 hereinafter) adapted to be communicably connected to the central server 102. The central server 102 communicates through a network with a plurality of client devices 104. The central server 102 includes the requisite firmware and software to communicate with the one or more client devices 104 and control the overall functioning of the central server 102. Besides, the firmware, the central server 102 may also include at least one database storing relevant data pertaining to candidates and a plurality of graders/evaluators. The central server 102 also stores gradation tests and the like, and application software for enabling the one or more client devices 104 to communicate with the central server 102 and vice-versa, as will be explained in the ensuing description. The central server 102 and the client devices 104 exchange information pertaining to identification details and gradation tests. Further, the one or more client devices 104 may include desktop computers, portable computing devices, mobile phones, tablet computer, and any other device having computing capability.

The present invention envisages that the system 100 may be used for setting the gradation test in a secure manner by enabling one or more authorized question paper contributors to submit their questions to the central server 102. Particularly, the at least one database comprises a question bank database adapted to store a plurality of questions, pre-determined responses thereto and weighted scores for each such response. The plurality of questions and pre-determined responses may be stored in an encrypted format. More particularly, different contributors may contribute different individual questions in the question bank database. In one embodiment of the present invention, the at least one database may include an authentication database having login details of all registered question paper contributors. The contributors may communicate with the central server 102 through their respective client device 104*a*, by providing their login details. The central server 102 may present the contributors with application software to enter their login details. Once authenticated by the central server 102, upon comparison of the login details entered by the contributors and the details in the authentication database, the central server 102 starts communicating with the authenticated client devices 104*a*. In an embodiment of the present invention, the central server 102 may communicate with the authenticated client device 104*a* using application software that enables them to input one or more questions along with the pre-determined response thereto. The said questions and pre-determined responses may be stored in the question-bank database in the central server 102. The said database may also store weighted scores for each response.

To prepare the gradation test while maintaining the confidentiality of gradation test, the present invention envisages that a chief contributor (exam setter), as shown in FIG. 1, assigned with the task of creating a gradation test may log on to the central server 102, as explained above, using his client device 104*b* and select the questions from question-bank database. The selected questions are then collated together to generate the gradation test, which is stored in an encrypted format at the central server 102, preferably in the at least one database. To maintain utmost confidentiality, the chief grader/evaluator may generate the gradation test only at a pre-determined time duration, such as moments before providing the gradation test to candidates. This ensures that there are no chances of unauthorized access to the gradation test, thereby preventing any chances of gradation test being available to unauthorized users.

Further, for presenting the gradation test to candidates in a seamless manner and conducting the gradation test by avoiding any over-heads on costs, the present invention envisages that the system 100 includes at least one exam-center servers 108 configured at various exam centers where the candidates take up the gradation test. The exam-center servers 108 are communicably coupled to the central server 102, over a secure communication channel and are adapted to present the gradation test to only authorized candidates in a secure manner. The at least one database comprises authentication/identification details of the at least one exam-center server 108. Particularly, just before the gradation test, the exam-center servers 108 at different exam centers may authenticate themselves at the central server 102 for establishing a time-bound communication channel. The central server 102 communicates only with those exam-center servers 108 that have been authenticated and are authorized. The authorized exam-center servers 108 would be pre-decided prior to the gradation test by the relevant gradation authorities and same would be identified in the at least one database at the central server 102. This ensures that an unauthorized server 108 cannot receive the gradation test, thereby further maintaining confidentiality.

Further, once authenticated, the central server 102 may transmit the gradation test generated by the chief contributor to the exam-center servers 108. Thus, the present invention enables the gradation tests to be provided only to intended exam centers and in an encrypted electronic form, thereby ensuring confidentiality. Further, transmission of the gradation test only at a pre-determined time duration prior to the commencement of examination adds to the security feature of the system 100.

The candidates may, using their client devices 104*c*, log in to the respective exam-center servers 108 by entering their roll number/registration number and a special code/key provided to them at the exam-center for taking the gradation test. The exam-center server 108 may include a candidate database storing roll number/registration number and other identification details along with the special key for each candidate pertaining to the exam center. The exam-center server 108 authenticates each of the candidates based on the details in the candidate database. Once authenticated, the exam-center server 108 may present the candidates with the gradation test retrieved from the central server 102 (at the pre-determined examination time) and the examination commences. In an embodiment, the client device 104*c* may have a specific software by way of which the gradation test may be interactively accessible to the candidates. Particularly, using the device 104*c* the candidates may access the question paper and provide their responses.

In another embodiment of the present invention, the central server 102 may not transmit the gradation test generated by the chief contributor to the exam-center servers 108 and once the candidate is authenticated by the exam-center server 108, the gradation test may be directly transmitted by the central server 102 to the client device 104*c* of each candidate.

Further, the present invention envisages that candidates may enter their answers/responses to one or more questions of the gradation tests through their client devices 104*c*. The candidates' responses are processed by the client devices 104*c* and transmitted to the central server 102 or the exam-center server 108 from where the gradation test was received. The responses may be stored in real-time in an encrypted format in a temporary answer-sheet database maintained either at the exam-center server 108 or directly in an answer-sheet database of at least one database at the central server 102. The answer-sheet database and the temporary answer-sheet database may be a relational database storing responses of the candidates in a manner that is relatable to the identification details of the candidates as well as the question bank database. Thus, the answer sheet databases may not be required to replicate entries pertaining to candidates' identification details and questions of the questions database to which the responses pertain. In an embodiment, the answer-sheet databases may be linked to the at least one database storing candidates' identification details for enabling the answer sheets to be appropriately related to respective candidate. This avoids the risk of erroneous tagging of the answer sheets as may otherwise happen in conventional methods. Thus, even if the answer-sheet database is retrieved by an unauthorized person, it will be difficult for him/her to access the details therein and manipulate the same. If the responses are stored in the temporary answer-sheet database, the exam-center database 108 replicates the data in the temporary answer-sheet database to the answer-sheet database.

In a preferred embodiment, the candidate may enter their answer/responses in their own handwriting and in any language of their choice. In the described embodiment, the candidate may be presented with a specific software on his client device 104c wherein the candidate may write his/her response using a stylus in his own handwriting. Thus, the candidate may write answers in any language of his choice. In an embodiment of the present invention the client devices 104c may include an application software that captures the candidates' responses in their handwriting and converts the same into an electronic format for storage. The client devices' 104c transmit the candidates' responses to at least one of the central server 102 and the exam-center server 108 on a real-time basis so that in a case of a hardware failure, the candidate will be able to continue from the point where the device hardware had failed. In case of complete hardware failure, the candidate can just pick up a new client device 104c, which has been configured as a valid client with the exam-center server 108, and start off from where they had left off.

In a preferred embodiment, at no instance is the gradation test or the answers thereto will be stored on the client device 104c and thus there is no requirement to clean up the client device 104c after the examination is completed. Also, the answers from the candidates are stored in an encrypted form and thus cannot be accessed ordinarily, thereby preventing any chances of tampering. It is also important to note here that each individual response from the candidates can be stored independently in the answer-sheet database with relational details of the question to which the response pertains as well as the details of the candidate who provided the response.

Further, the present invention envisages that the gradation test would automatically conclude after passage of a pre-determined time duration, such as three hours. In an embodiment, the application software in candidate's client device 104c may be automatically disabled after the pre-determined time duration has passed so that no further questions after the said duration may be answered by the candidates, thereby ensuring uniformity in practice across all the exam centers. After conclusion of the gradation test, the answer sheet database, if stored at the exam-center servers 108, may be permanently transmitted to the central server 102 over the secure channel therebetween, with no copy thereof being maintained at the exam-center server 108.

The present system also provides that in case of any eventuality if for some reason the client device 104c has a hardware fault, the candidate would be able to restart their test from wherever they left, by just picking up another device and logging in again. Since their solutions are always stored on the central server 102, they would not lose anything due to a hardware fault in the client device.

Figure 2:
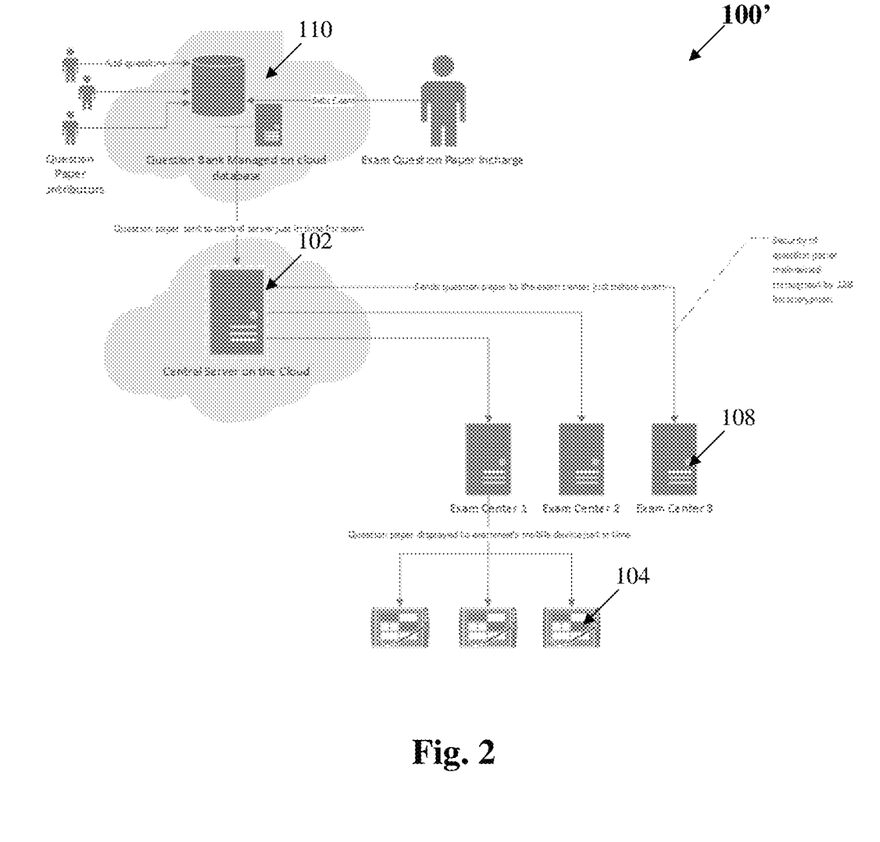
FIG. 2 illustrates an exemplary environment that may facilitate electronic evaluation of candidates in accordance with another embodiment of the invention.

FIG. 2 illustrates another embodiment of the present invention in which the answer sheets of candidates may be evaluated. As shown in FIG. 2, a system 100' is suggested in which the authorized graders/evaluators may log on to the central server 102' using their client devices 104d and retrieve the encrypted responses from the answer-sheet database maintained therein. The central server 102' is coupled to exam-center server 108'. It is to be noted that the central server 102' and exam-center server 108' are similarly configured as central server 102 and exam-center server 108, and thus a detailed description thereof is being avoided for sake of brevity. Each grader/evaluator may be assigned one or more batches of answer sheets for evaluation and the identification details of assigned answer sheets along with that of the assigned grader/evaluator may be stored in another database in at least one database. This avoids any human errors creeping in during tagging of answer sheets, as may happen in conventional methods. The grader/evaluator may access each question answered by the candidates and give different weighted scores as per the level of accuracy of the answer. In an embodiment, the question-bank database may also store different weighted scores per level of accuracy for each of the questions such that the graders/evaluators may not be allowed to allocate weighted scores arbitrarily and they are required to select the weighted scores selected from that stored in the database only. This may enable uniformity in evaluation practice across different graders/evaluators.

The present invention also envisages that different answers of each candidate may be accessible to different graders/evaluators for assessment and evaluation. Thus, one response of candidate may be evaluated by different graders/evaluators as per their expertise in subject matter pertaining to each question. In an embodiment, the same answer may be evaluated by different graders/evaluators and averaged weighted scores may be assigned to each answer.

In another embodiment, the answer-sheets may be evaluated by a computer and not by a human. The central server 102' may, by artificial intelligence, compare the answers with standard answers stored in a standard-answers database (relatable to question-bank database) and assign the weighted scores accordingly. This would help to reduce human intervention. The central server 102' may also include a handwriting recognition module to determine the candidates' answers written in their handwriting.

Further, the weighted score assigned to each evaluated answer is stored in the answer-sheet database. Once the evaluation of all answer sheets is complete, the weighted scores for each candidate may be electronically aggregated and final results may be generated. In an embodiment, the aggregated marks may also be stored in the candidate database for future use, such as for preparation of aggregated marks sheet after the conclusion of a course work.

Furthermore, the answer sheets of the candidates, along with the marks allocated to each answer, can be made automatically available to the candidates just for viewing, after the evaluation is complete. The present invention ensures that this activity is carried out seamlessly, and does not result in any extra effort by the examination conducting body. This brings greater transparency into the examination system.

Figure 3:
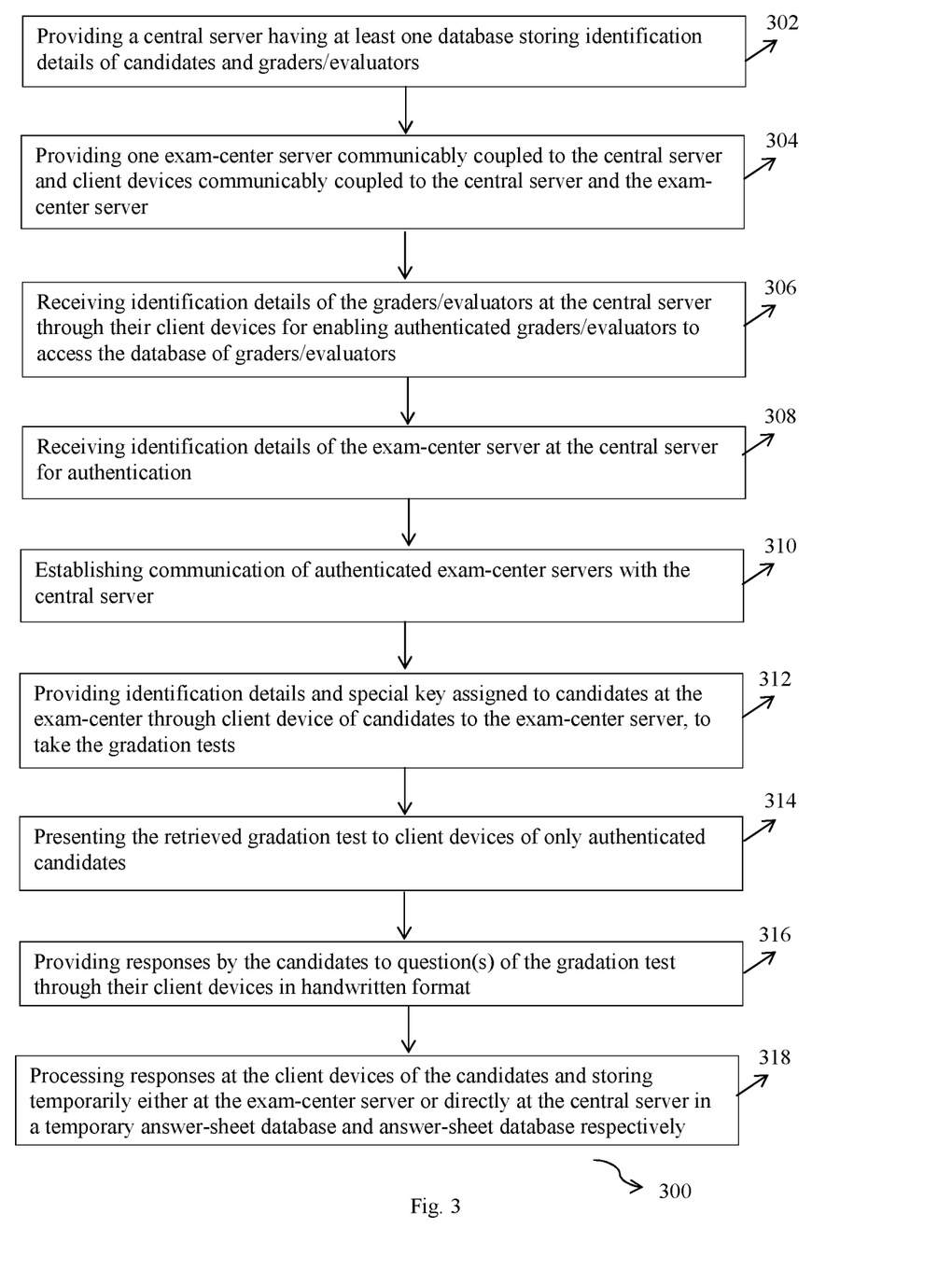
FIG. 3 illustrates a flowchart of an exemplary method that may facilitate electronic evaluation of candidates in accordance with another embodiment of the invention.

A method implemented in system 100, for enabling electronic evaluation of candidates shall be explained with reference to FIG. 3. FIG. 3 illustrates a flow diagram represented a method 300 for electronic evaluation of the candidates. Since the method 100 is implemented in system 100, the features thereof as referred in the method herein and already explained with reference to the system 100, will not be explained again for sake of brevity. At 302, the method comprises providing a central server 102 having the at least one database storing the identification details of candidates and the plurality of graders/evaluators. As explained, the at least one database is also adapted to store gradation tests in a question-bank database. The method further includes, at 304, providing the at least one exam-center server 108 communicably coupled to the central server 102. At 304, the method includes providing a plurality of client devices (104a, 104b, 104c, 104d) that are adapted to be communicably coupled to the central server 102 and the at least one exam-center server 108. As explained, the client devices are adapted to exchange information pertaining to the identification details of the user thereof (such as candidates or graders/evaluators) and gradation tests with the central server 102 and the at least one exam-center server 108.

Further, the method includes, at 306, receiving identification details of the graders/evaluators at the central server 102 through their client devices 104a for enabling the authenticated graders/evaluators to access the at least one database, and more specifically the question bank database therein, as per one of the embodiments of the present invention. The process of authentication has already been explained earlier and is not being repeated herein for sake of brevity. Once authenticated, the graders/evaluators can either contribute questions and pre-determined responses thereto or prepare gradation tests based on the already stored questions in the question-bank database. In an embodiment, the gradation test may be created just before the examination. Further, at 308, the identification details of the exam-center server 108 are received at the central server 102 for authentication thereof and authenticated exam-center servers 108 establish communication with the central server 102, at 310, for a pre-determined period to retrieve the gradation tests. As explained, the pre-determined period could be a duration of the examination and thus the connection between exam-center server 108 and central server 102 is not permanent. To take the gradation tests, at 312, the candidates provide their identification details and special key assigned to them at the exam-center through their client device 104c to the exam-center server 108. The process of authentication of candidates at the exam-center server 108 has already been explained and the same is not being repeated for sake of brevity. The method further provides that at 314, the retrieved gradation test at step 310 is presented to client devices 104c of only the authenticated candidates. The candidates provide their responses to one or more questions of the gradation test through their client devices 104c in an electronic format or handwritten format, at 316. The said responses are processed at the client devices 104c of the candidates and either stored temporarily at the exam-center server 108 or directly at the central server 102, as explained earlier, in a temporary answer-sheet database and answer-sheet database, respectively, at 318.

For evaluating the candidates' responses, the method provides that graders/evaluators authenticate themselves at the central server 102, at 320, by providing their identification details. Once authenticates, the graders/evaluators are provided with candidates' responses on their client devices 104d, at 322. The graders/evaluators evaluate each response and assign a weighted score based on level of accuracy of the response. The method commences with the weighted scores for each candidate being electronically aggregated and stored in the at least one database.

Further, various modifications are possible. For instance, in an embodiment of the present invention, the question-bank database may be configured in a separate server (not shown) maintained in a cloud. In the described embodiment, the graders/evaluators may logon to the separate server to access the question-bank database and store their questions therein or retrieve questions to generate the gradation test. The gradation test so generated may be stored on the server, in an embodiment, such that at the time of examination, the exam center server 108' may log on to the central server 102', which in term communicates with the separate server to retrieve the gradation test. This enables to conduct the gradation test with enhanced security, for instance as in the discussed embodiment a two-tier security check is provided, first at the central server 102' and then at the separate server.

As is evident from the afore-said, the present invention enables seamless transfer of information from one point to another without compromising on the security and in a time-efficient and cost-effective manner. All information is stored in various databases and thus the present invention envisages decentralization of information. When required, the system 100 and 100' enables only the authorized person to collate the requisite information, thereby ensuring higher confidentiality. Besides, owing to all information being electronically stored and linked by way of databases, the overheads on administration of logistics is substantially reduced. Further, in an embodiment of the present invention, the connection between various entities, such as client device-server, server-server and the like may be enabled using at least 128 bit encryption and using the public-private key encryption logic, thereby enhancing the security feature. Additionally, the candidates may take the test in their own handwriting, thereby dispensing with the requirement to generate a specifically configured electronic gradation test or requiring the candidates to be computer savvy or experienced in typing using the keyboards or touch screen input devices. In a nut-shell, the present invention enables evaluation of candidates to be carried out electronically in a manner which saves time, efforts and undesired costs.

As one of ordinary skill in the art may appreciate, the example system and method described herein can be modified. For example, certain steps can be omitted, certain steps can be carried out concurrently, and other steps can be added. Although particular embodiments of the invention have been described in detail, it is understood that the invention is not limited correspondingly in scope, but includes all changes, modifications and equivalents coming within the spirit and terms of the claims appended hereto.

Since other modifications and changes varied to fit particular operating requirements and environments are apparent to those skilled in the art, the invention is not considered limited to the example chosen for purposes of disclosure, and covers all changes and modifications which do not constitute departures from the true spirit and scope of this invention.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for electronic evaluation of candidates, the system comprising:
 a central server (102) having at least one database configured to store identification details of the candidates, identification details of graders/evaluators and one or more gradation tests for evaluating the candidates;
 at least one exam-center server (108) communicably coupled to the central server (102) for presenting the gradation tests to the candidates communicating with the at least one exam-center server (108); and
 a plurality of client devices (104a, 104b, 104c, 104d) configured to be communicably coupled to the central server (102) and at least one exam-center server (108) over a network to exchange information pertaining to the identification details of the candidates and the graders/evaluators and the gradation tests, the plurality of client devices pertaining to the candidates and the graders/evaluators;
 wherein the central server (102) is configured to receive the identification details of the candidates and the graders/evaluators through the respective client devices thereof and enable the candidates and the graders/evaluators to access, via the respective client devices, the at least one database upon authentication of the identification details of the candidates and the graders/evaluators, and
 wherein the client devices (104a, 104b) of the graders/evaluators communicate with the central server (102) upon authentication to contribute questions and pre-determined responses thereto, and prepare the gradation tests, and
 wherein the at least one exam-center server (108) communicates with the central server (102) at a pre-determined time to retrieve the gradation tests and present the retrieved gradation tests, for a pre-determined time duration, at authenticated client devices (104c) of the candidates for receiving responses of the candidates in a handwritten format in any language of choice of the candidates, and
 wherein the client devices of the candidates and/or the graders/evaluators include one or more software applications which when executed enables the client devices to allow the candidates to provide the responses in the handwritten format and/or the graders/evaluators to grade the responses, using a writing instrument including a stylus,
 wherein the candidates' responses in the handwritten format are processed electronically and transmitted by the client devices (104c) of the candidates to at least one of the central server (102) and the at least one exam-center server (108) for storage, and
 wherein the candidates' responses are accessed by the authenticated client devices (104d) of the graders/evaluators to evaluate the candidates based on the responses of the candidates to the gradation tests.

2. The system as claimed in claim 1, wherein the at least one database comprises a question bank database storing a plurality of questions, pre-determined responses thereto and weighted scores for each response, and at least one grader/evaluator selects questions from the question bank database to prepare the gradation tests that are stored on the central server (102) in an encrypted format.

3. The system as claimed in claim 1, wherein the candidates provide responses to the gradation tests in an electronic format using the client devices of the candidates.

4. The system as claimed in claim 1, wherein the at least one database further comprises identification details of the at least one exam-center server (108) so that the central server (102) communicates with the at least one exam-center server (108) only upon receiving the identification details of the at least one exam-center server (108) thereof and authenticating the at least one exam-center server (108).

5. The system as claimed in claim 1, wherein one or more identification numbers and special key are provided at the at least one exam-center server (108) from the client devices of the candidates to authenticate the candidates and the respective client devices at the at least one exam-center server (108), prior to being presented with the gradation tests.

6. The system as claimed in claim 2, wherein the responses of the candidates to one or more questions of the gradation tests are stored continuously in real-time on at least one of the central server (102) and the at least one exam-center server (108) in an encrypted format, in an incremental manner.

7. The system as claimed in claim 6, wherein the at least one database further comprises an answer-sheet database for storing the responses of the candidates, the answer-sheet database being a relational database relatable to the identification details of the candidates as well as the question bank database.

8. The system as claimed in claim 7, wherein the at least one exam-center server (108) further comprises a temporary answer-sheet database for storing the responses of the candidates, the at least one exam-center server (108) replicating data including the responses of the candidates, in the temporary answer-sheet database, in the answer-sheet database of the central server (102).

9. The system as claimed in claim 6, wherein one or more authenticated client devices (104d) of the graders/evaluators are configured to access the responses of the candidates for enabling the graders/evaluators to evaluate the responses of the candidates and provide scores thereto, the scores for each response being stored at the central server (102).

10. The system as claimed in claim 6, wherein the client devices of the candidates include an application software for capturing the responses of the candidates provided in the handwritten format and for converting the responses of the candidates in an electronic format for storage.

11. The system as claimed in claim 1, wherein the gradation test and the candidates' response may be presented in any language of choice of candidate.

12. A method for electronic evaluation of candidates, the method comprising the steps of:
 providing a central server (102) having at least one database configured to store identification details of the candidates, identification details of graders/evaluators, and one or more gradation tests for evaluating the candidates;
 providing at least one exam-center server (108) communicably coupled to the central server (102) for presenting the gradation tests to the candidates communicating with the at least one exam-center server (108);
 providing a plurality of client devices (104a, 104b, 104c, 104d) configured to be communicably coupled to the central server (102) and the at least one exam-center server (108) over a network to exchange information pertaining to the identification details of the candidates and the graders/evaluators and the gradation tests, the plurality of client devices pertaining to the candidates and the graders/evaluators;

receiving the identification details of the candidates and the graders/evaluators at the central server (102) through the respective client devices (104a, 104b) of the candidates and the graders/evaluators to enable the candidates and the graders/evaluators to access, via the respective client devices, the at least one database upon authentication of the identification details of the candidates and the graders/evaluators;

establishing communication of the client devices (104a, 104b) of the graders/evaluators with the central server (102) upon authentication for enabling the graders/evaluators to contribute questions and pre-determined responses thereto, and preparing the gradation tests;

receiving identification details of the at least one exam-center server (108) at the central server (102) for the central server (102) to authenticate the at least one exam-center server (108) and communicate with the authenticated one exam-center server (108);

retrieving the gradation tests at the at least one exam-center server (108) upon establishing communication of the at least one exam-center server with the central server (102) at a pre-determined time;

receiving the identification details of the candidates, through the client devices (104c) of the candidates, at the at least one exam-center server (108);

presenting the retrieved gradation tests at authenticated client devices (104c) of candidates for a pre-determined time duration;

receiving responses of the candidates to the gradation tests in a handwritten format in any language of choice of the candidates;

processing the candidates' responses in the handwritten format electronically at the client devices (104c) of the candidates and transmitting the electronically processed responses to at least one of the central server (102) and the at least one exam-center server (108) for storage;

receiving the identification details of the graders/evaluators at the central server (102) through the client devices (104d) of the graders/evaluators;

evaluating the candidates' responses at authenticated client devices (104d) of the graders/evaluators, and wherein the client devices of the candidates and/or the graders/evaluators include one or more software applications which when executed enables the client devices to allow the candidates to provide the responses and/or the graders/evaluators to grade the responses, using a writing instrument including a stylus.

13. The method as claimed in claim 12, wherein the at least one database comprises a question bank database storing a plurality of questions, pre-determined responses thereto and weighted scores for each response, and the step of preparing gradation tests comprises at least one grader/evaluator selecting questions from the question bank database and storing the selected questions on the central server (102) in an encrypted format.

14. The method as claimed in claim 12, wherein the step of receiving responses include the candidates providing responses to the gradation tests in an electronic format using the client devices of the candidates.

15. The method as claimed in claim 12, wherein the step of retrieving gradation tests at the at least one exam-center server (108) comprises the central server (102) communicating with the at least one exam-center server (108) only upon receiving the identification details of the at least one exam-center server (108) and authenticating the at least one exam-center server (108), the identification details of the at least one exam-center server (108) being stored in at least one database.

16. The method as claimed in claim 12, the step of presenting the retrieved gradation tests at authenticated client devices (104c) of the candidates comprises providing one or more identification numbers and special key at the at least one exam-center server (108) from the client devices of candidates to authenticate the candidates and the respective client devices at the at least one exam-center server (108), prior to being presented with the gradation tests.

17. The method as claimed in claim 13, wherein the step of receiving responses of the candidates to the gradation tests comprises storing responses of the candidates to one or more questions of the gradation tests in continuously real-time on at least one of the central server (102) and the at least one exam-center server (108) in an encrypted format, in an incremental manner.

18. The method as claimed in claim 16, wherein the at least one database comprises an answer-sheet database for storing the responses of the candidates, the answer-sheet database being a relational database relatable to the identification details of the candidates as well as the question bank database.

19. The method as claimed in claim 18, wherein the at least one exam-center server (108) comprises a temporary answer-sheet database for storing the responses of the candidates, the at least one exam-center server (108) replicating data including the responses of the candidates, in the temporary answer-sheet database, in the answer-sheet database of the central server (102).

20. The method as claimed in claim 17, wherein the step of evaluating the candidates' responses comprises one or more authenticated client devices (104d) of the graders/evaluators accessing the responses of the candidates responses for enabling the graders/evaluators to evaluate the responses of the candidates, providing scores thereto, and storing scores for each response at the central server (102).

21. The method as claimed in claim 16, wherein the client devices of the candidates include an application software for capturing the responses of the candidates provided in the handwritten format and for converting the responses of the candidates in an electronic format for storage.

22. The method as claimed in claim 12, wherein the gradation test and the candidates' response may be presented in any language of choice of candidate.

* * * * *